US010073603B2

(12) United States Patent
Zavattaro et al.

(10) Patent No.: US 10,073,603 B2
(45) Date of Patent: Sep. 11, 2018

(54) METHOD AND APPARATUS FOR PROVIDING NOTIFICATION OF A COMMUNICATION EVENT VIA A CHRONOLOGICALLY-ORDERED TASK HISTORY

(71) Applicant: Nokia Technologies Oy, Espoo (FI)

(72) Inventors: Manuela Zavattaro, San Francisco, CA (US); Guilherme Schneider, London (GB); David Carruthers, London (GB)

(73) Assignee: Nokia Technologies Oy, Espoo (FI)

(*) Notice: Subject to any disclaimer, the term of this patent is extended or adjusted under 35 U.S.C. 154(b) by 127 days.

(21) Appl. No.: 14/201,055

(22) Filed: Mar. 7, 2014

(65) Prior Publication Data
US 2015/0253972 A1 Sep. 10, 2015

(51) Int. Cl.
*G06F 9/46* (2006.01)
*G06F 3/0484* (2013.01)
*G06F 9/451* (2018.01)
*H04L 12/58* (2006.01)
*G06F 9/44* (2018.01)

(52) U.S. Cl.
CPC ...... *G06F 3/04847* (2013.01); *G06F 3/04842* (2013.01); *G06F 9/4443* (2013.01); *G06F 9/451* (2018.02); *H04L 51/24* (2013.01)

(58) Field of Classification Search
CPC .......................................... G06F 9/52
USPC ........................................ 718/106
See application file for complete search history.

(56) References Cited

U.S. PATENT DOCUMENTS

| | | | | |
|---|---|---|---|---|
| 8,042,110 B1* | 10/2011 | Kawahara | ............. | G06F 9/4443 715/764 |
| 2003/0041112 A1* | 2/2003 | Tada | .................... | G06Q 10/107 709/206 |
| 2005/0268237 A1* | 12/2005 | Crane | .................. | G06F 3/0481 715/732 |
| 2007/0061806 A1* | 3/2007 | Jeong | ................ | H04M 1/72522 718/100 |

(Continued)

FOREIGN PATENT DOCUMENTS

WO   WO 2012/170446 A2   12/2012

OTHER PUBLICATIONS

International Search Report and Written Opinion for Application No. PCT/FI2015/050009 dated Mar. 23, 2015.

*Primary Examiner* — Mehran Kamran
(74) *Attorney, Agent, or Firm* — Alston & Bird LLP

(57) ABSTRACT

A method, apparatus and computer program product are provided to facilitate task management with a chronologically-ordered task history such that a user may more readily determine the status of various tasks and may efficiently interact therewith. The method, apparatus and computer program product may provide for notification of a communication event to be integrated into the chronologically-ordered task history so as to provide a visible reminder to the user of recent communication events. In the context of a method, a chronologically-ordered task history may be caused to be presented. The chronologically-ordered task history may include task representations of a plurality of respective tasks with the task representations being ordered chronologically based upon user interaction therewith. The method may also include receiving a communication event from another party and causing notification of the communication event to be provided, such as by by modifying the chronologically-ordered task history.

20 Claims, 6 Drawing Sheets

(56) References Cited

U.S. PATENT DOCUMENTS

| | | | | |
|---|---|---|---|---|
| 2008/0082936 A1* | 4/2008 | Helvick | G06F 9/4443 | 715/779 |
| 2008/0094370 A1* | 4/2008 | Ording | G06F 3/04883 | 345/173 |
| 2009/0254843 A1* | 10/2009 | Van Wie | H04L 12/1822 | 715/757 |
| 2010/0011321 A1* | 1/2010 | Nakayama | G06F 3/04817 | 715/811 |
| 2011/0154208 A1* | 6/2011 | Horii | H04L 67/22 | 715/736 |
| 2011/0161878 A1* | 6/2011 | Stallings | G06F 3/0482 | 715/811 |
| 2012/0030623 A1* | 2/2012 | Hoellwarth | G06F 3/04817 | 715/811 |
| 2012/0054662 A1* | 3/2012 | Kieselbach | G06Q 10/107 | 715/772 |
| 2012/0084691 A1* | 4/2012 | Yun | H04M 1/72519 | 715/769 |
| 2012/0204191 A1* | 8/2012 | Shia | G06Q 10/10 | 719/318 |
| 2013/0007150 A1* | 1/2013 | Hertz | H04L 51/32 | 709/206 |
| 2013/0007665 A1* | 1/2013 | Chaudhri | G06F 9/4443 | 715/830 |
| 2013/0074076 A1* | 3/2013 | Lindenfeld | G06Q 10/06 | 718/100 |
| 2013/0083059 A1* | 4/2013 | Hwang | G06F 11/323 | 345/629 |
| 2013/0139113 A1* | 5/2013 | Choudhary | G06F 3/0484 | 715/847 |
| 2013/0145301 A1* | 6/2013 | Kim | G06F 3/0481 | 715/772 |
| 2013/0152007 A1* | 6/2013 | Costenaro | G06F 3/0481 | 715/779 |
| 2013/0174179 A1* | 7/2013 | Park | G06F 9/4843 | 718/107 |
| 2013/0332216 A1* | 12/2013 | George | G06Q 10/063114 | 705/7.15 |
| 2013/0346882 A1* | 12/2013 | Shiplacoff | G06F 3/04842 | 715/753 |
| 2014/0053116 A1* | 2/2014 | Smith | G06F 9/4443 | 715/863 |
| 2014/0164533 A1* | 6/2014 | Lynch | H04L 51/046 | 709/206 |
| 2014/0164953 A1* | 6/2014 | Lynch | H04L 51/046 | 715/753 |
| 2014/0170625 A1* | 6/2014 | Medina | G09B 5/06 | 434/317 |
| 2015/0067602 A1* | 3/2015 | Bernstein | G06F 3/0488 | 715/823 |
| 2015/0089438 A1* | 3/2015 | Wu | G06F 3/0482 | 715/776 |
| 2015/0262583 A1* | 9/2015 | Kanda | H04N 5/232 | 704/275 |

\* cited by examiner

US 10,073,603 B2

METHOD AND APPARATUS FOR PROVIDING NOTIFICATION OF A COMMUNICATION EVENT VIA A CHRONOLOGICALLY-ORDERED TASK HISTORY

TECHNOLOGICAL FIELD

An example embodiment of the present invention relates generally to the presentation of a task history and, more particularly, to the provision of a notification of a communication event via a chronologically-ordered task history.

BACKGROUND

Computing devices, such as mobile terminals, e.g., mobile telephones, smart phones, tablets, companion devices, such as smart watches, or the like, are capable of performing a plurality of different tasks. For example, the tasks performed by a computing device may include operation of a web browser, a music player, a mapping application, an email application, other types of electronic messaging applications or the like. A computing device may initiate these tasks in response to user direction and/or in response to other input, such as in response to an incoming voice call, email or other electronic message. While some tasks may be performed sequentially, a computing device may operate a plurality of tasks concurrently.

Users of computing devices who have interacted with a plurality of tasks may be unable to quickly recall which tasks are currently active and which tasks have now been closed. As such, task management may be less efficient than is desired as the concurrent operation of a plurality of tasks may decrease the efficiency with which a user accesses and interacts with a respective task. Task management may be further complicated by incoming communication events, such as incoming voice calls, incoming email messages, incoming text messages or the like. These incoming communication events may trigger activity associated with one or more tasks, such as a voice mail application, an email application, a text message application or the like, even though the user is not otherwise interacting with the tasks. The challenges associated with task management in this instance may be manifested in various manners. For example, a user of a computing device having multiple ongoing tasks may forget to timely respond to a communication event, such as a voice mail, an email, a text message or the like, as a result of the user's preoccupation with other tasks if the user does not respond relatively immediately to the communication event. In instances in which a user is interacting with other tasks, however, it may be inconvenient for the user to be interrupted in order to respond relatively immediately to a communication event.

BRIEF SUMMARY

A method, apparatus and computer program product of an example embodiment are provided to facilitate task management with a chronologically-ordered task history such that a user may more readily determine the status of various tasks and may efficiently interact therewith. Additionally, the method, apparatus and computer program product of an example embodiment may provide for notification of a communication event to be integrated into the chronologically-ordered task history so as to provide a visible reminder to the user of recent communication events. As such, a user may be reminded in an instance in which the user desires to respond to the communication event regardless of whether the user responds immediately or sometime thereafter.

In an example embodiment, a method is provided that includes causing a chronologically-ordered task history to be presented. The chronologically-ordered task history includes task representations of a plurality of respective tasks with the task representations being ordered chronologically based upon user interaction therewith. The method of this example embodiment also includes receiving a communication event from another party and causing notification of the communication event to be provided. In this regard, the notification of the communication event is provided by modifying the chronologically-ordered task history.

The method of an example embodiment may cause notification of the communication event by re-ordering the task representations such that the task representation associated with the communication event is positioned in a manner so as to provide notification. For example, the method of an example embodiment may re-order the task representations so as to position the task notification associated with the communication event in a position indicative of the task with which the user has most recently interacted. Additionally or alternatively, the method of an example embodiment may cause notification of the communication event by adding notification indicia to the task representation associated with the communication event. The notification event may include a number of communication events of a type with which the respective task representation is associated that have been missed and/or are unread. The task representation associated with the communication event may include a header that includes the notification indicia. The task representation of an example embodiment may include an event history representation associated with a respective contact of the user. The event history representation may include, for example, information associated with a message or a voice call involving the contact.

In another example embodiment, an apparatus is provided that includes at least one processor and at least one memory including computer program code with the at least one memory and the computer program code configured to, with the processor, cause the apparatus to at least cause a chronologically-ordered task history to be presented. The chronologically-ordered task history includes task representations of a plurality of respective tasks with the task representations being ordered chronologically based upon user interaction therewith. The at least one memory and the computer program code are also configured to, with the processor, cause the apparatus of this example embodiment to receive the communication event from another party and to cause notification of the communication event to be provided by modifying the chronologically-ordered task history.

The at least one memory and the computer program code may be configured to, with the processor, cause the apparatus of an example embodiment to cause notification of a communication event by re-ordering the task representations such that the task representation associated with the communication event is positioned in a manner so as to provide notification, such as by being placed in a position indicative of the task with which the user has most recently interacted. Additionally or alternatively, the at least one memory and the computer program code may be configured to, with the processor, cause the apparatus of an example embodiment to cause notification of the communication event by adding notification indicia to the task representation associated with the communication event. The notification indicia of an example embodiment may include a number of communication events of a type with which the respective task representation is associated that have been missed and/or are unread. The task representation associated with the communication event may include a header that includes the notification indicia. The task representation of an example embodiment may include an event history representation associated with a respective contact of the user. For example, the event history representation may include information associated with a message or voice call involving the contact.

In a further example embodiment, a computer program product is provided that includes at least non-transitory computer-readable storage medium having computer-executable program code portions stored therein with the computer-executable program code portions including program code instructions for causing a chronologically-ordered task history to be presented. The chronologically-ordered task history includes task representations of a plurality of respective tasks with the task representations being ordered chronologically based upon user interaction therewith. The computer-executable program code portions of this example embodiment may also include program code instructions for receiving a communication event from another party and causing notification of the communication event to be provided by modifying the chronologically-ordered task history.

The program code instructions for causing notification of the communication event may include program code instructions for re-ordering the task representations such that the task representation associated with the communication event is positioned in a manner so as to provide notification. For example, the program code instructions for re-ordering the task representations may include program code instructions for re-ordering the task representations so as to position the task notification associated with the communication event in a position indicative of the task with which the user has most recently interacted. The program code instructions for causing notification of the communication event may additionally or alternatively include program code instructions for adding notification indicia to the task representation associated with the communication event. In an example embodiment, the notification indicia may include a number of communication events of a type with which the respective task representation is associated that have been missed and/or are unread. The task representation associated with the communication event may include a header that includes a notification indicia.

In yet another example embodiment, an apparatus is provided that includes means for causing a chronologically-ordered task history to be presented. The chronologically-ordered task history may include task representations of a plurality of respective tasks with the task representations being ordered chronologically based upon user interaction therewith. The apparatus may also include means for receiving a communication event from another party and means for causing notification of the communication event to be provided by modifying the chronologically-ordered task history.

BRIEF DESCRIPTION OF THE DRAWINGS

Figure 1:
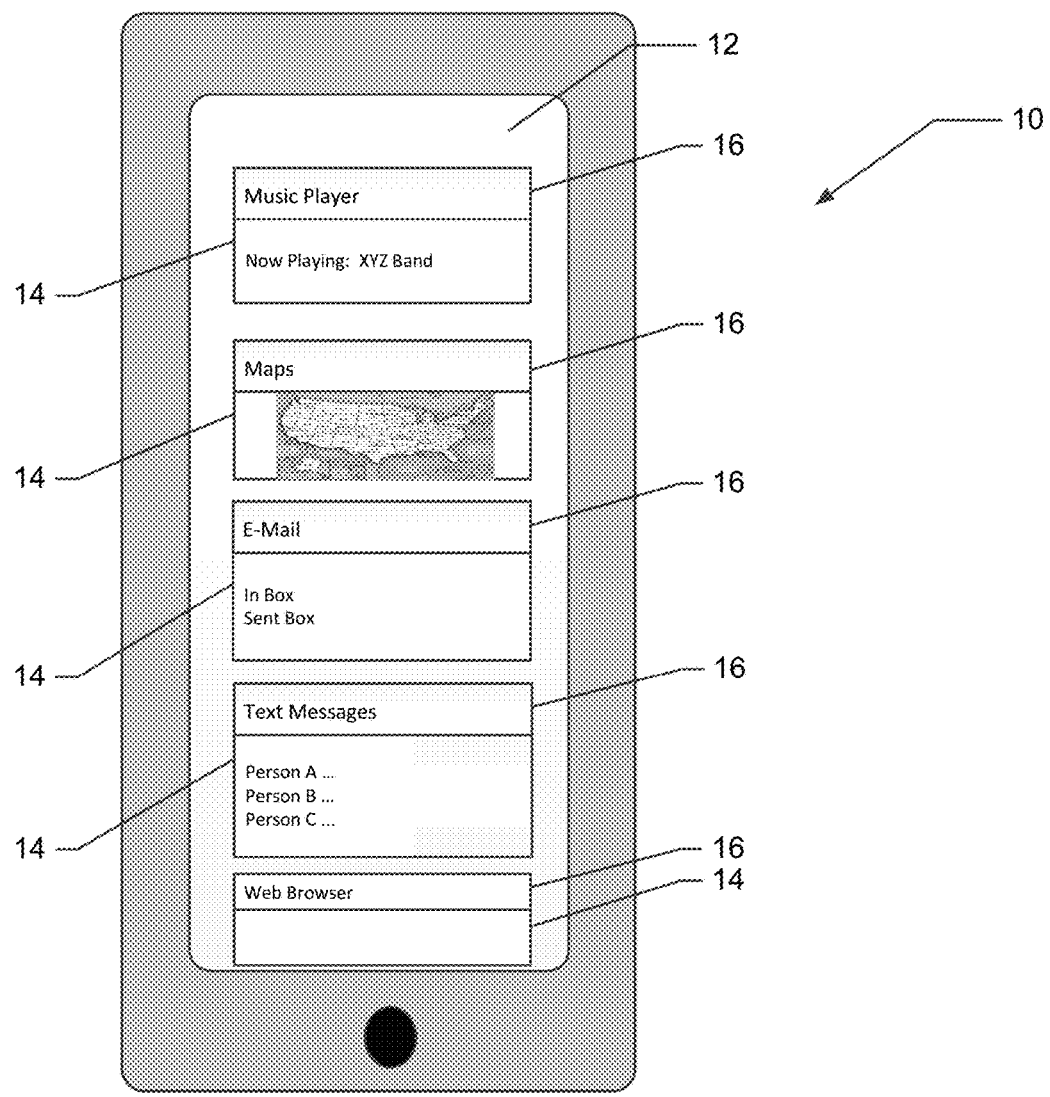
Figure 2:
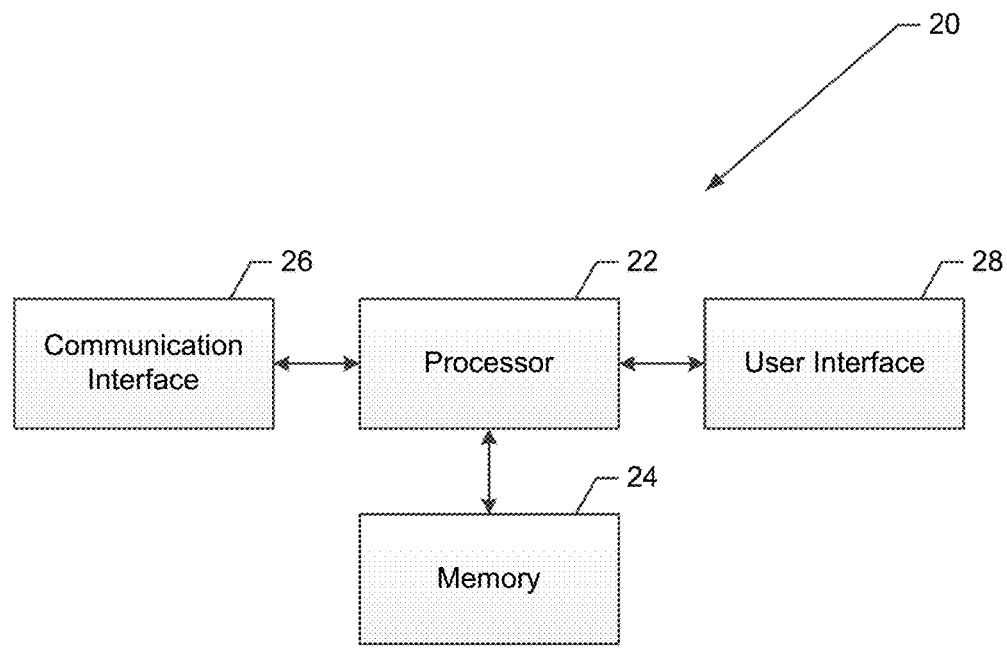
Figure 3:
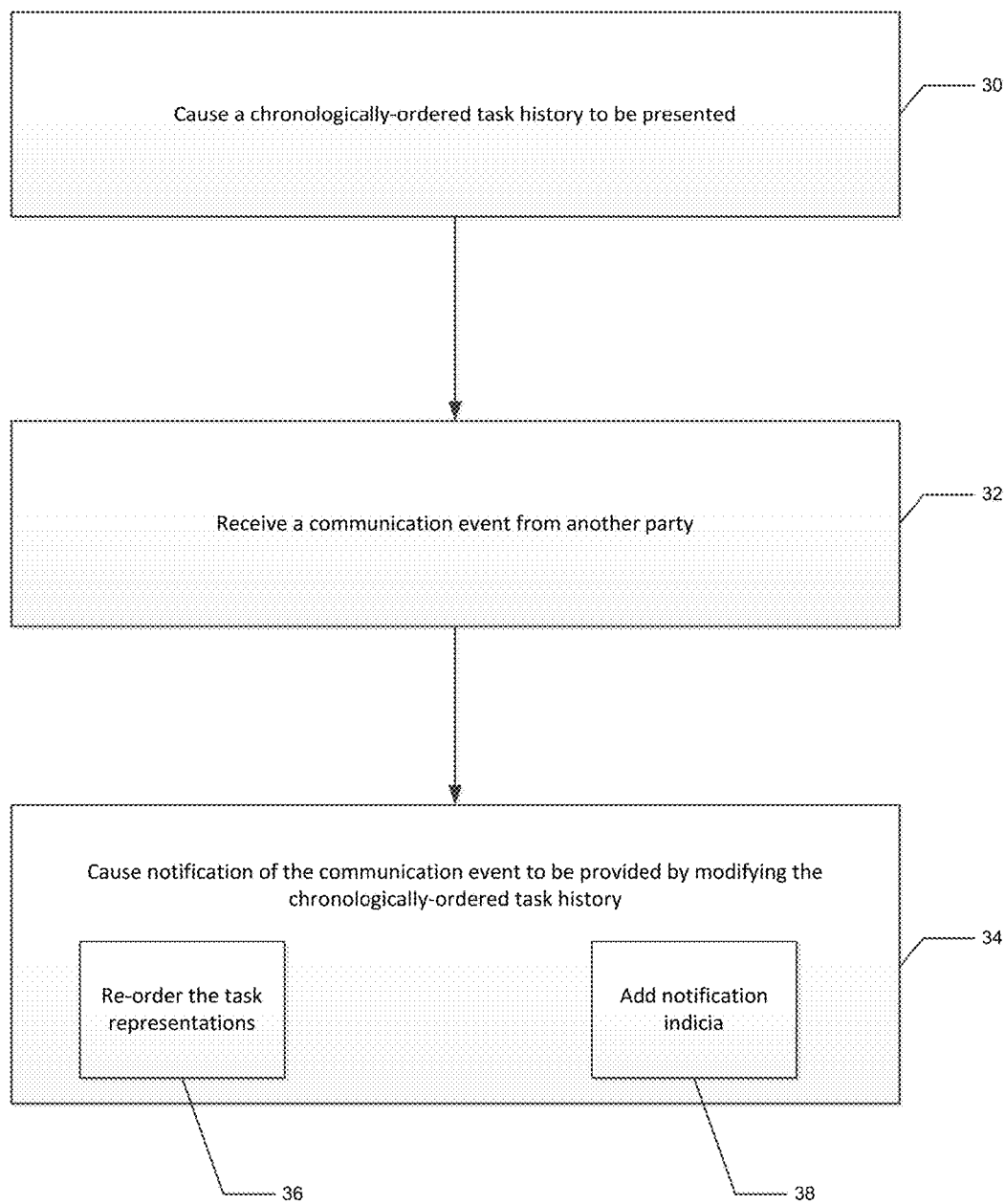
Figure 4:
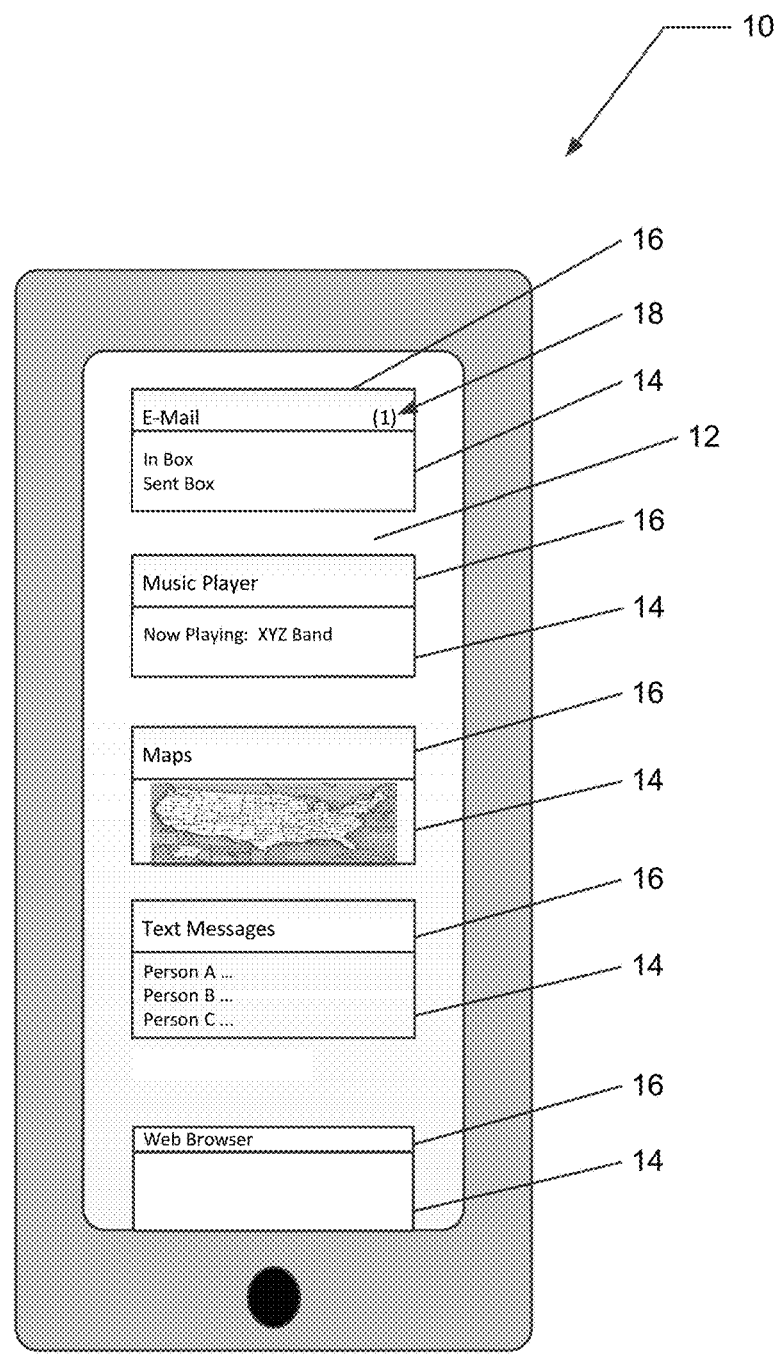
Figure 5:
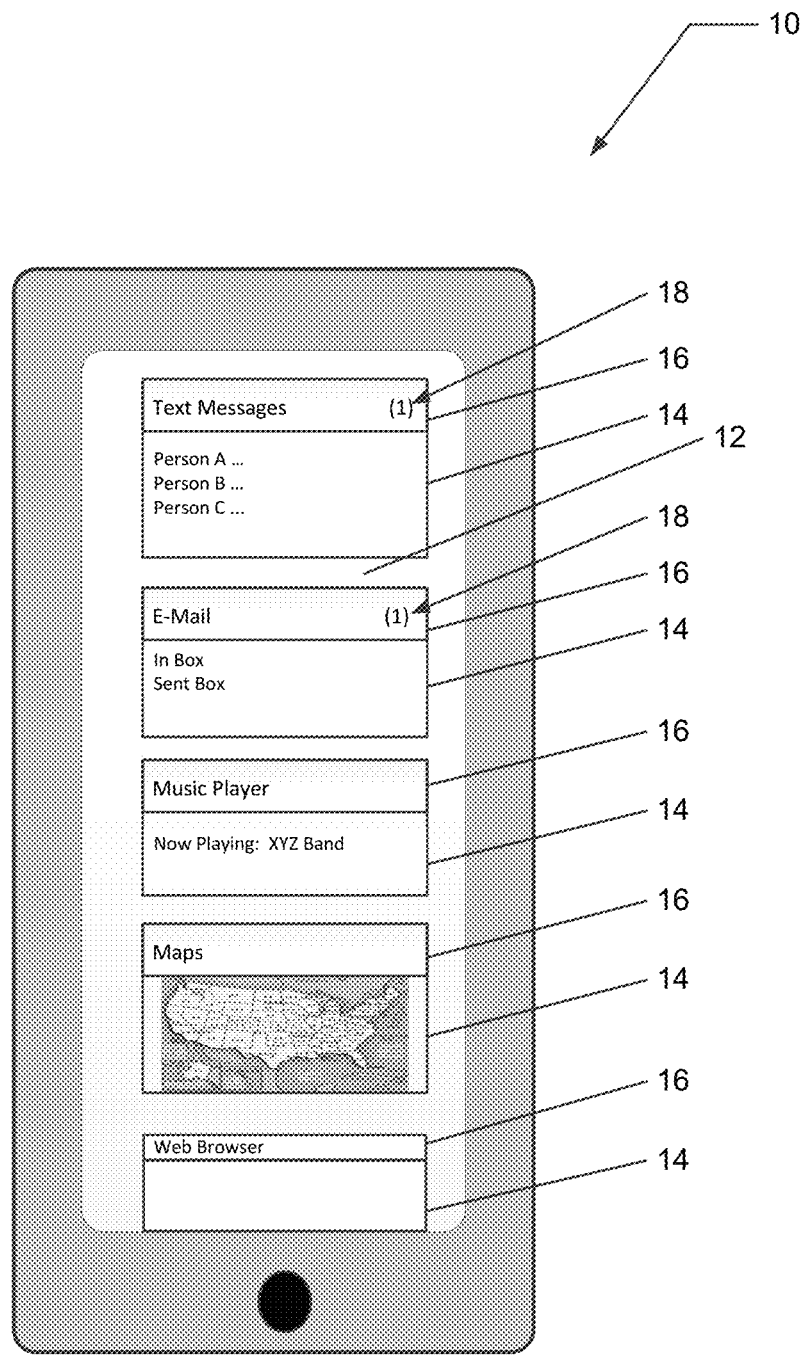
Figure 6:
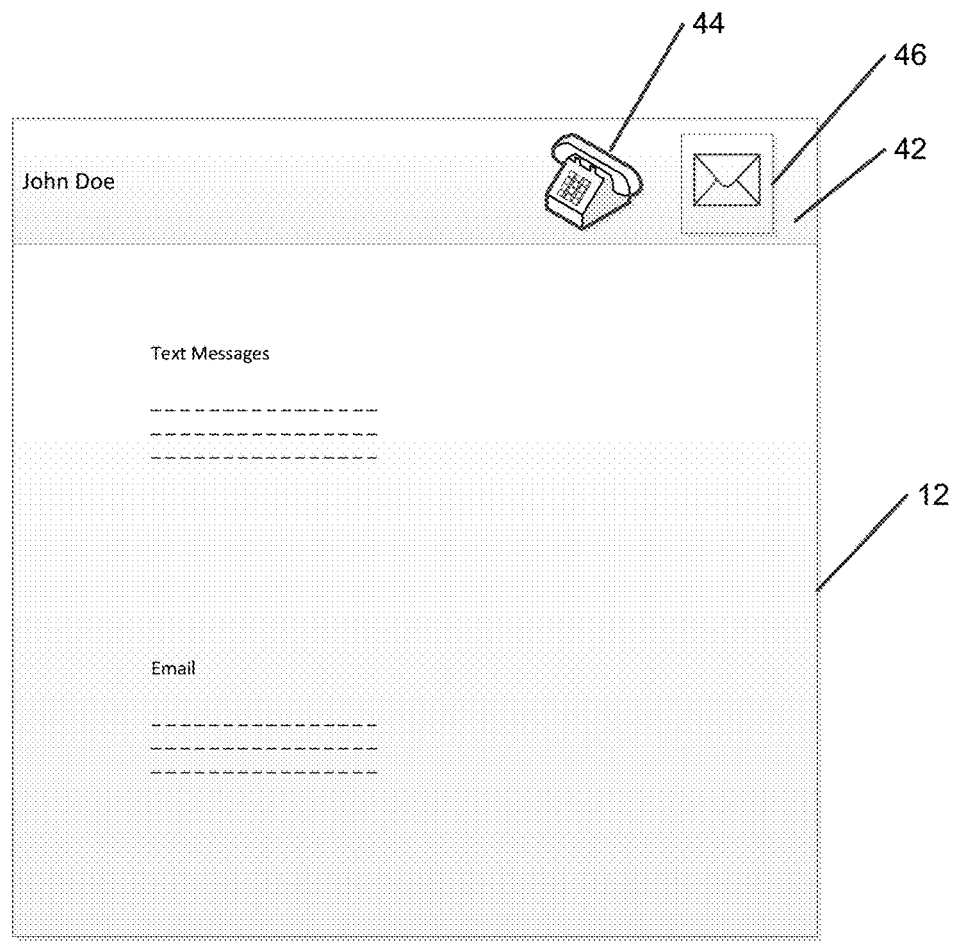

Having thus described example embodiments of the invention in general terms, reference will now be made to the accompanying drawings, which are not necessarily drawn to scale, and wherein:

FIG. 1 is a plan view of a computing device, such as a mobile terminal, that may be configured to present a chronologically-ordered task history in accordance with an example embodiment of the present invention;

FIG. 2 is a block diagram of an apparatus that may be specifically configured in accordance with an example embodiment of the present invention;

FIG. 3 is a flow chart illustrating operations performed, such as by the apparatus of FIG. 2, in accordance with an example embodiment of the present invention;

FIG. 4 is a plan view of the computing device of FIG. 1 in which the chronologically-ordered task history has been modified in order to cause notification of a communication event to be provided in accordance with an example embodiment of the present invention;

FIG. 5 is a plan view of the computing device of FIGS. 1 and 4 in which the chronologically-ordered task history has been further modified in order to cause notification of another communication event to be provided in accordance with an example embodiment of the present invention; and FIG. 6 illustrates an event history representation associated with a respective contact of the user and including a header that includes notification indicia in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Referring now to FIG. 1, a computing device 10 that includes a display 12 for presentation of a chronologically-ordered task history, e.g., a task workflow, is depicted. In the illustrated embodiment and as described below for purposes of example but not of limitation, the computing device may be a mobile telephone, such as a smart phone. However, a wide variety of other types of computing devices may be configured in accordance with an example embodiment of the present invention. For example, the computing device may include mobile terminals, such as a personal digital assistant (PDA), mobile telephone, smartphone, companion device, e.g., a smart watch, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems. Alternatively, the computing device may include a fixed computing device, such as personal computer, a desktop computer, a computer workstation or the like.

Regardless of a manner in which the computing device 10 is embodied, the computing device includes a display 12 or is otherwise associated with a display, such as in an instance in which the computing device is in communication with an external or remote display. As shown in FIG. 1, the computing device is configured to cause a chronologically-ordered task history to be presented upon the display. In this regard, the task history includes task representations 14 of a plurality of respective tasks. The task history may include task representations of a wide variety of different tasks including tasks associated with various different applications. By way of example but without limitation, the task history presented upon the display of the computing device of FIG. 1 includes a task associated with a music player, a task associated with a mapping application, a task associated with an e-mail application, a task associated with a text message application and a task associated with a web browser application.

Task representations 14 may be embodied in various manners, such as by respective documents, e.g., HTML5 documents. Although the task representations may simply identify the respective tasks, the task representations may include additional information regarding the respective tasks. With respect to the music player application, for example, the task representation may identify the artist of the track being currently played. The task representation of the mapping application may include a representation of the map that was most recently displayed. The task representation for the e-mail application may include links to the different mail boxes, such as the inbox, sent box, etc. and may optionally include information regarding the most recently received and/or sent e-mail messages. Similarly, the task representation of the text message application may identify the parties with which text messages have most recently been exchanged.

The task history is chronologically ordered based upon user interaction therewith. Thus, the task representation 14 associated with the task with which the user has most recently interacted may be positioned in a first predefined position, the task representation associated with the task with which the user interacted immediately prior to the most recent task may be positioned in a second predefined position and so on. In the illustrated embodiment, the task representation associated with the task with which the user most recently interacted may be positioned in the uppermost location upon the display 12 with the other task representations positioned thereunder in accordance with the order in which the user interacted therewith. With reference to FIG. 1, for example, the chronologically-ordered task history indicates that the user interacted with the music player more recently than the map application, the user interacted with the map application more recently than the e-mail application, the user interacted with the e-mail application more recently than the text message application and the user interacted with the text message application more recently than the web browser application.

While the vertical representation from top to bottom as depicted in FIG. 1 is one example of a chronologically-ordered task history, the task representations 14 may be chronologically ordered in other manners. For example, the task representations may be ordered from bottom to top, left to right, right to left, center to radially outward or the like. While the task representations may be spaced apart from one another as shown in FIG. 1, the task representations may be at least partially overlapped, such as in the manner of a fanned deck of cards, with the headers 16 of the task representations that are described below remaining visible. In this embodiment, the task representations may be stacked in the at least partially overlapped manner such that the order of the task representations is indicative of the order in which the user has interacted with the tasks. For example, the uppermost task representation may be associated with the task with which the user most recently interacted, the bottom most task representation may be associated with the task with which the user has not interacted for the longest period of time and each intervening task representation may be associated with a task with which the user has interacted less recently than the tasks associated with the task representations that lie thereabove and more recently than the tasks associated with the task representations that lied therebelow.

The computing device 10 may include or otherwise be associated with an apparatus 20, such as depicted in FIG. 2, for causing the chronologically-ordered task history to be presented and for integrating notification of communication events within the chronologically-ordered task history as will be described below. In this regard, the apparatus may include may include or otherwise be in communication with a processor 22, a memory device 24, a user interface 26 and a communication interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device. However, in some embodiments, the apparatus may be embodied as a chip or chip set. In other words, the apparatus may comprise one or more physical packages (e.g., chips) including materials, components and/ or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., the mobile terminal 10) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 also includes a user interface 26, such as a display 12, that may be in communication with the processor 22 to provide output to the user and, in some embodiments, to receive an indication of a user input. In some embodiments, the user interface may also include a keyboard, a mouse, a joystick, touch areas, soft keys, one or more microphones, a plurality of speakers, or other input/output mechanisms. In an example embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

The apparatus 20 of the illustrated embodiment also includes a communication interface 28 that may be any means such as a device or circuitry embodied in either hardware or a combination of hardware and software that is configured to receive and/or transmit data from/to a communications device in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

Referring now FIG. 3, the operations performed to cause a chronologically-ordered task history to be presented in a manner that integrates notification of communication events within the chronologically-ordered task history in accordance with an example embodiment are depicted. As shown in block 30 of FIG. 3, the apparatus 20 may include means, such as the processor 22, the user interface 28 or the like, for causing a chronologically-ordered task history to be presented. As shown in FIG. 1, the chronologically-ordered task history includes task representations 14 of a plurality of respective tasks. The task representations are ordered chronologically based upon user interaction therewith. As described above, the chronologically-ordering of the task representations may be accomplished in various manners, such as top to bottom, bottom to top, left to right, right to left, center to radially outward or the like. Moreover, while the task representations of the chronologically-ordered task history of FIG. 1 are shown to be separated from one another, the task history may be visually presented in other manners, such as in an at least partially overlapped manner with the ordering of the task representations being indicative of the recency of the user interaction therewith.

As a result of the chronological-ordering of the task history, the task representation 14 associated with the task with which the user must recently interacted is placed in a predefined position relative to the remainder of the task representations. In FIG. 1, for example, the task representation associated with the task with which the user most recently interacted is the uppermost task representation, that is, the music player task representation. If the user subsequently interacts with a different task, such as the web browser, the task representation associated with the other task, e.g., the web browser task representation, would be repositioned so as to be the uppermost task representation with the other task representations, including the music player task representation, being moved downwardly relative thereto. As such, a user may review the chronologically-ordered task history in order to determine the status of the various tasks and may quickly determine the task with which the user most recently interacted, thereby facilitating further interaction with those same tasks.

As shown in block 32 of FIG. 3, the apparatus 20 may also include means, such as the processor 22, the communication interface 28 or the like, for receiving a communication event from another party. Various types of communication events may be received including voice calls, emails and other electronic messages, such as text messages, short message service (SMS) messages, multimedia messaging service (MMS) messages and the like. In accordance with an example embodiment, the apparatus may also include means, such as the processor, the user interface 26 or the like, for causing notification of the communication event to be provided by modifying the chronologically-ordered task history. As such, the notification of the user of the communication event that has been received from another party may be integrated within the chronologically-ordered task history. Thus, a user reviewing the chronologically-ordered task history may also be made aware of a communication event that has been received from another party such that the user is able to respond to the communication event in a timely manner and is less likely to overlook the receipt of the communication event in the course of interacting with other tasks.

The chronologically-ordered task history may be modified in various manners in order to cause notification of the communication event. As shown in block 36 of FIG. 3 and as depicted in FIG. 4, the apparatus 20 may include means, such as the processor 22, the user interface 26 or the like, for causing notification of the communication event by re-ordering the task representations 14 such that the task representation associated with the communication event is positioned in a manner so as to provide notification. For example, the task representation associated with the communication event may be positioned in a position relative to the other task representations that is indicative of the task with which the user has most recently interacted. As shown in FIG. 4 in which the uppermost task representation of the chronologically-ordered task history is associated with the task with which the user has most recently interacted, the task representation associated with the communication event may be re-ordered so as to be in the uppermost position with the other task representations being pushed downwardly within the chronologically-ordered task history. Thus, a user may quickly determine that a communication event has been received from another party by reviewing the re-ordered task history. With reference to FIG. 4, the re-ordering of the task representations so as to place the email task representation in the uppermost position may notify the user that an email has been received and is unread.

As shown in FIG. 5, in an instance in which a text message is thereafter received from another party, the apparatus 20, such as the processor 22, the user interface 26 or the like, may again re-order the task representations 14 such that the task representation associated with the text message application is located in the position indicative of the task with which the user is most recently interacted, such as the uppermost location within the chronologically-ordered task history. Thus, the user may quickly and efficiently determine that a text message was most recently received from another party and that an email was previously received from another party such that those communication events are less likely to be overlooked in the course of interacting with various other ongoing tasks.

The notification of the communication event may be provided in other manners in addition to or instead of re-ordering the task representations 14. For example, in addition to or instead of re-ordering the task representations, the apparatus 20 of an example embodiment may include means, such as the processor 22, user interface 26 or the like, for causing notification of the communication event to be provided by adding notification indicia 18 to the task representation associated with the communication event. See block 38 of FIG. 3. The notification indicia may be provided in various manners, but may provide an indication of the number of communication events of a type with which the respective task representation is associated that have been missed or are unread. For example, the task representation associated with the email application of FIG. 4 includes a numerical indication, e.g., 1, indicative of a single email that has not yet been read. Similarly, the task representation associated with the text message application of FIG. 5 includes a numerical indication, e.g., 1, indicative of a single text message that is unread. In an instance in which a voice call is received, but is unanswered, a task representation associated with voice calls may also provide a numerical indication of the number of voice calls that have been missed.

Once a user reads an email or other type of electronic message returns a voice call or otherwise responds to a communication event, the notification indicia associated with the respective communication event may be reset, such as being decremented by one, or eliminated in an instance in which the user has responded or considered all communication events of the type associated with a respective task representation 14, such as by having read all emails or text messages. For example, the notification indicia associated with a missed voice call may be reset, such as by being reduced by one, or eliminated in an instance in which there are no other missed voice calls once the user places a voice call to or otherwise communicates with, such as via text message, email or the like, the party who originally placed the voice call to the user. Additionally, the apparatus 20, such as the processor 22, the user interface 26 or the like, may permit the user to reset the notification indicia of individual task representations or all task representations in response to a predefined user input.

The notification indicia 18 may be provided in various manners. In the illustrated embodiment, the task representations 14 may include a header 16 that identifies the respective task and the notification indicia may be included within the header so as to be readily recognizable by the user. While the notification indicia may provide an indication of a number of communication events of a type with which the respective task representation is associated that have been missed or are unread, other types of notification indicia may be provided. For example, the task representation or a portion of the task representation, such as the header of the task representation, may include an icon indicative of the type of communication event that has been missed or is unread. For example, the notification indicia may include a telephone icon to indicate a missed voice call or an envelope icon to indicate an unread email. Additionally or alternatively, the task representation or a portion of the task representation, such as the header of the task representation, may be presented in a different color or in a different presentation style, such as blinking or flashing, in an instance in which a communication event of the type with which the respective task representation is associated has been missed or is unread.

As shown in FIGS. 1, 4 and 5, the task representations 14 may be associated with respective application, such as an email application, a text message application, a music player application, a mapping application, a web browser application or the like. In another embodiment, however, the task representation may include an event history representation 40 associated with a respective contact of the user. As shown in FIG. 6, for example, the event history representation of an example embodiment may include information associated with a message or voice call involving the contact, e.g., John Doe. For example, the event history representation may include the most recent text messages, emails and/or voice calls from the respective contact. In addition, the event history representation may include notification indicia indicative of communication events from the respective contact that have been missed or are unread. In the illustrated example of FIG. 6, the telephone icon 44 and the email icon 46 in the header 42 are indicative of at least one missed voice call and at least one unread email message from the respective contact.

In this example embodiment, each or at least a plurality of the contacts of the user may have an associated event history representation 40 with the event history representations being included within the chronologically-ordered task history and ordered therewithin based upon the recency with which the respective contact has attempted to communicate with the user. In this example embodiment, a user may not only determine the status and recency with which the user has interacted with various applications, but can also efficiently determine the respective contacts from who the user has missed communication events, such as voice calls, emails or other electronic messages.

The method, apparatus and computer program product of an example embodiment therefore facilitate task management with a chronologically-ordered task history such that a user may more readily determine the status of various tasks and may efficiently interact therewith. As described above, the method, apparatus and computer program product of an example embodiment may provide for notification of a communication event to be integrated into the chronologically-ordered task history so as to provide a visible reminder to the user of recent communication events. A user may therefore be reminded in an instance in which the user desires to respond to the communication event regardless of whether the user responds immediately or sometime thereafter.

As described above, FIG. 3 illustrates a flowchart of an apparatus 20, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:

causing a chronologically-ordered task history to be presented, wherein the chronologically-ordered task history comprises task representations of a plurality of respective tasks, wherein the task representations are associated with different respective applications such that each task representation includes each task of the respective application with which the task representation is associated, and wherein the task representations are ordered chronologically based upon user interaction with the respective applications with which the task representations are associated such that the task representation associated with the application with which a user most recently interacted is presented in a predefined position;

receiving a communication event from another party including at least one of a voice call that was unanswered or an electronic message that is unread; and causing notification of the communication event to be provided by modifying, with a processor of a mobile terminal, the chronologically-ordered task history, wherein causing notification of the communication event comprises re-ordering the task representations in response to receipt of the communication event from the another party such that the task representation associated with the application supporting the communication event is positioned following the re-ordering in a manner so as to provide notification of the receipt of the communication event, and wherein re-ordering the task representations comprises re-ordering the task representations so as both: (i) to remove the task representation associated with the communication event from its prior position between first and second task representations within the chronologically-ordered task history and (ii) to re-position the task representation associated with the communication event in the predefined position previously indicative of the application with which the user has most recently interacted such that re-ordering of the task representations results in the task representation associated with the communication event no longer being positioned between the first and second task representations, wherein the re-ordering of the task representations further results in the task representations being ordered based upon a combination of an order in which the communication event was received and a chronological order of user interaction with the applications with which other task representations are associated such that the order of the task representations includes the task representation associated with the application supporting the communication event in the predefined position and the other task representations in the chronological order of user interaction with the respective applications, other than the application that supports the communication event, with which the other task representations are associated.

2. A method according to claim 1 wherein causing notification of the communication event comprises adding notification indicia to the task representation associated with the communication event.

3. A method according to claim 2 wherein the notification indicia comprises a number of communication events of a type with which the respective task representation is associated that have been missed or are unread.

4. A method according to claim 2 wherein the task representation associated with the communication event comprises a header that includes the notification indicia.

5. A method according to claim 1 wherein the task representation comprises an event history representation associated with a respective contact of the user, wherein the event history representation comprises information associated with a message or voice call involving the contact.

6. A method according to claim 5 wherein the event history representation comprises one or more of the most recent electronic messages and voice calls involving the contact.

7. A method according to claim 1 wherein causing the chronologically ordered task history to be presented comprises causing the task representations to present different information depending upon the application with which a respective task representation is associated.

8. An apparatus embodied by a mobile terminal and comprising at least one processor and at least one memory including computer program code, the at least one memory and the computer program code configured to, with the processor, cause the apparatus to at least:

cause a chronologically-ordered task history to be presented, wherein the chronologically-ordered task history comprises task representations of a plurality of respective tasks, wherein the task representations are associated with different respective applications such that each task representation includes each task of the respective application with which the task representation is associated, and wherein the task representations are ordered chronologically based upon user interaction with the respective applications with which the task representations are associated such that the task representation associated with the application with which a user most recently interacted is presented in a predefined position;

receive a communication event from another party; and cause notification of the communication event to be provided by modifying the chronologically-ordered task history, wherein the at least one memory and the computer program code are configured to, with the processor, cause the apparatus to cause notification of the communication event by re-ordering the task representations in response to receipt of the communication event from the another party such that the task representation associated with the application supporting the communication event is positioned following the re-ordering in a manner so as to provide notification of the receipt of the communication event, and wherein re-ordering the task representations comprises re-ordering the task representations so as both: (i) to remove the task representation associated with the communication event from its prior position between first and second task representations within the chronologically-ordered task history and (ii) to re-position the task representation associated with the communication event in the predefined position previously indicative of the application with which the user has most recently interacted such that re-ordering of the task representations results in the task representation associated with the communication event no longer being positioned between the first and second task representations, wherein the re-ordering of the task representations further results in the task representations being ordered based upon a combination of an order in which the communication event was received a chronological order of user interaction with the applications with which other task representations are associated such that the order of the task representations includes the task representation associated with the application supporting the communication event in the predefined position and the other task representations in the chronological order of user interaction with the respective applications, other than the application that supports the communication event, with which the other task representations are associated.

9. An apparatus according to claim 8 wherein the at least one memory and the computer program code are configured to, with the processor, cause the apparatus to cause notification of the communication event by adding notification indicia to the task representation associated with the communication event.

10. An apparatus according to claim 9 wherein the notification indicia comprises a number of communication events of a type with which the respective task representation is associated that have been missed or are unread.

11. An apparatus according to claim 9 wherein the task representation associated with the communication event comprises a header that includes the notification indicia.

12. An apparatus according to claim 8 wherein the task representation comprises an event history representation associated with a respective contact of the user, wherein the event history representation comprises information associated with a message or voice call involving the contact.

13. An apparatus according to claim 12 wherein the event history representation comprises one or more of the most recent electronic messages and voice calls involving the contact.

14. An apparatus according to claim 8 wherein the at least one memory and the computer program code are configured to, with the processor cause the apparatus to cause the chronologically ordered task history to be presented by causing the task representations to present different information depending upon the application with which a respective task representation is associated.

15. A computer program product comprising at least one non-transitory computer-readable storage medium having computer-executable program code portions stored therein, the computer-executable program code portions comprising program code instructions, executed by a processor of a mobile terminal, for:
  causing a chronologically-ordered task history to be presented, wherein the chronologically-ordered task history comprises task representations of a plurality of respective tasks, wherein the task representations are associated with different respective applications such that each task representation includes each task of the respective application with which the task representation is associated, and wherein the task representations are ordered chronologically based upon user interaction with the respective applications with which the task representations are associated such that the task representation associated with the application with which a user most recently interacted is presented in a predefined position;
  receiving a communication event from another party including at least one of a voice call that was unanswered or an electronic message that is unread; and
  causing notification of the communication event to be provided by modifying the chronologically-ordered task history, wherein the program code instructions for causing notification of the communication event comprise program code instructions for re-ordering the task representations in response to receipt of the communication event from the another party such that the task representation associated with the application supporting the communication event is positioned following the re-ordering in a manner so as to provide notification of the receipt of the communication event, and
  wherein re-ordering the task representations comprises re-ordering the task representations so as both: (i) to remove the task representation associated with the communication event from its prior position between first and second task representations within the chronologically-ordered task history and (ii) to re-position the task representation associated with the communication event in the predefined position previously indicative of the application with which the user has most recently interacted such that re-ordering of the task representations results in the task representation associated with the communication event no longer being positioned between the first and second task representations, wherein the re-ordering of the task representations further results in the task representations being ordered based upon a combination of an order in which the communication event was received a chronological order of user interaction with the applications with which other task representations are associated such that the order of the task representations includes the task representation associated with the application supporting the communication event in the predefined position and the other task representations in the chronological order of user interaction with the respective applications, other than the application that supports the communication event, with which the other task representations are associated.

16. A computer program product according to claim 15 wherein the program code instructions for causing notification of the communication event comprise program code instructions for adding notification indicia to the task representation associated with the communication event.

17. A computer program product according to claim 16 wherein the notification indicia comprises a number of communication events of a type with which the respective task representation is associated that have been missed or are unread.

18. A computer program product according to claim 16 wherein the task representation associated with the communication event comprises a header that includes the notification indicia.

19. A computer program product according to claim 15 wherein the task representation comprises an event history representation associated with a respective contact of the user, wherein the event history representation comprises one or more of the most recent electronic messages and voice calls involving the contact.

20. A computer program product according to claim 15 wherein the program code instructions for causing the apparatus to cause the chronologically ordered task history to be presented comprise program code instructions for causing the task representations to present different information depending upon the application with which a respective task representation is associated.

* * * * *